Inventor
LE ROY F. BAUER

Nov. 16, 1943.  LE ROY F. BAUER  2,334,376
SEEDER
Filed April 26, 1941  5 Sheets-Sheet 2
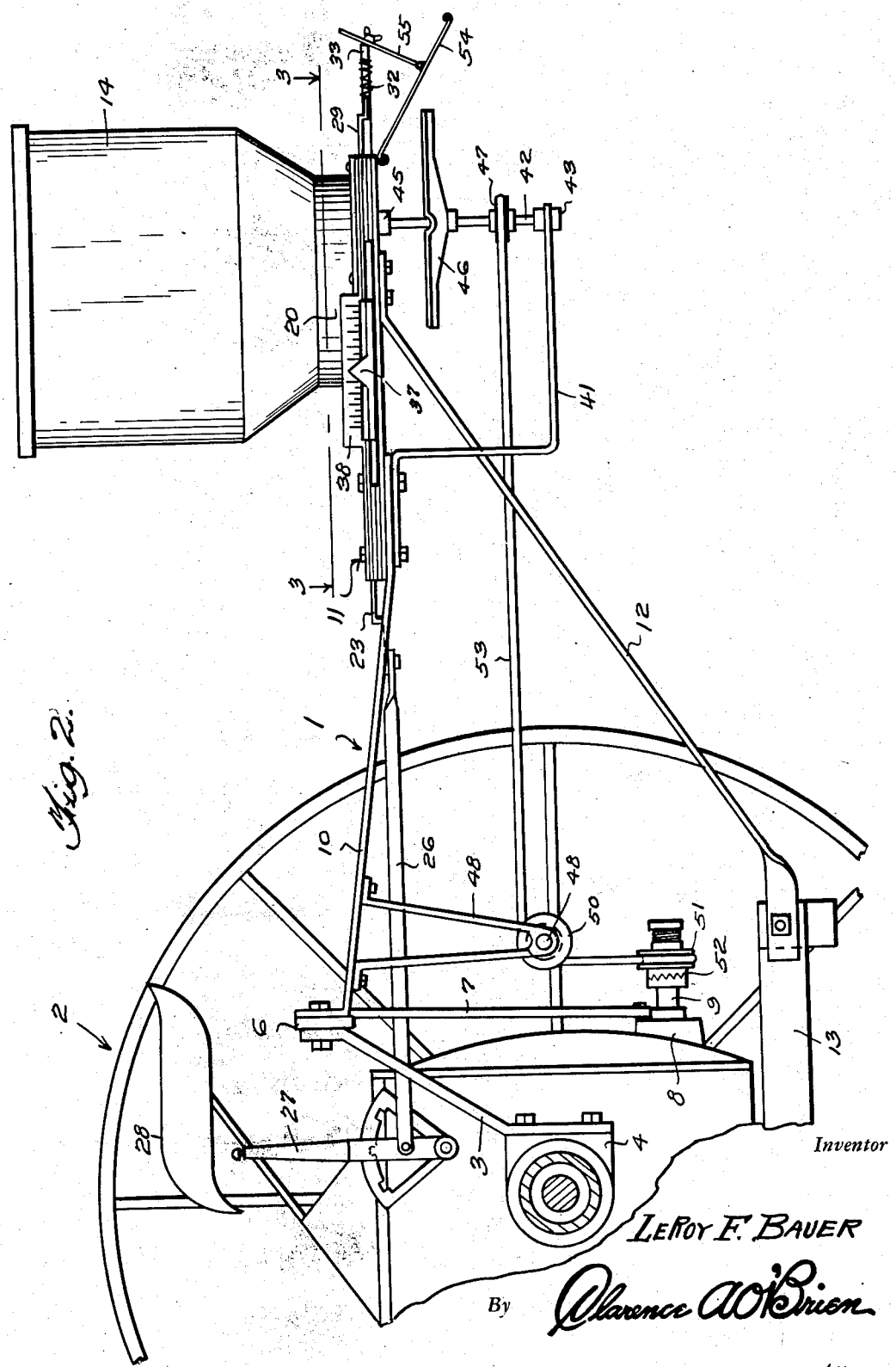

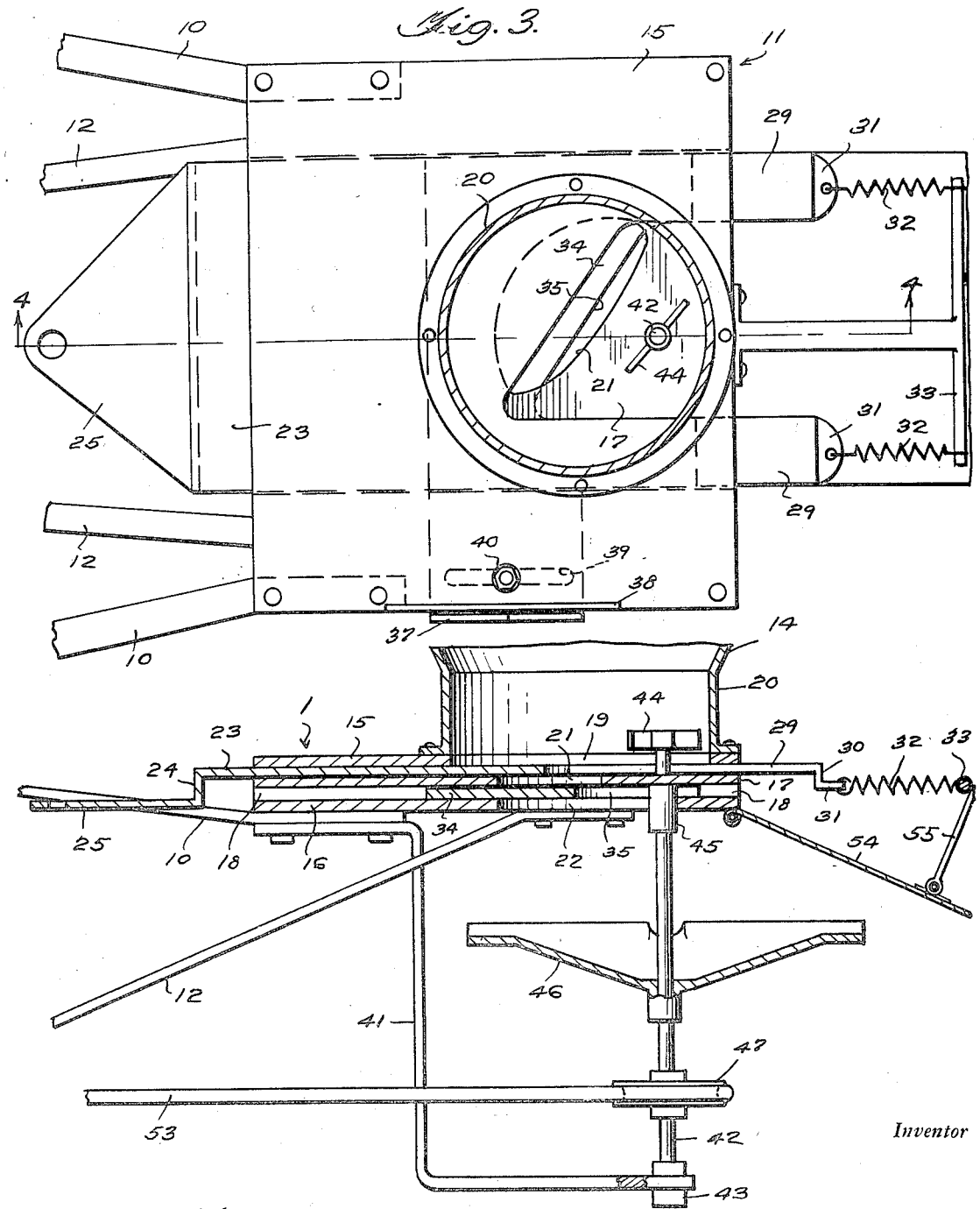

Nov. 16, 1943.   LE ROY F. BAUER   2,334,376
SEEDER
Filed April 26, 1941   5 Sheets-Sheet 4

Inventor
LE ROY F. BAUER

By *Clarence A. O'Brien*

Attorney

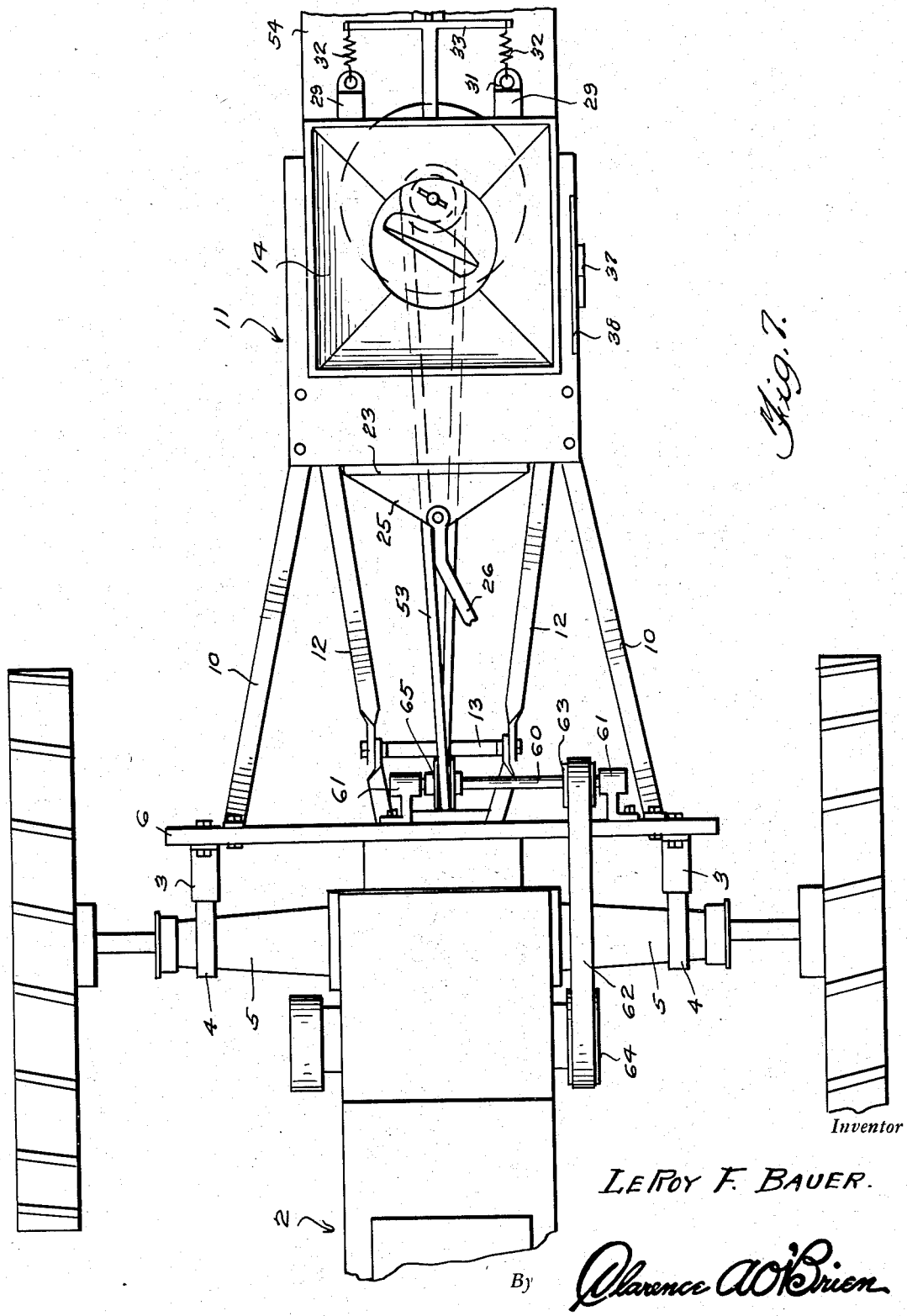

Patented Nov. 16, 1943

2,334,376

UNITED STATES PATENT OFFICE 2,334,376

SEEDER

Le Roy F. Bauer, Clinton, Iowa

Application April 26, 1941, Serial No. 390,611

1 Claim. (Cl. 275—8)

The present invention relates to new and useful improvements in grass seeders and has for its primary object to provide, in a manner as hereinafter set forth, a device of this character which is adapted to be expeditiously mounted on and driven by a conventional tractor, thus permitting the ground to be seeded and dragged in a single operation by one person.

Another very important object of the invention is to provide a tractor mounted and operated seeder of the aforementioned character which comprises novel means for regulating and controlling the discharge of the seed.

Other objects of the invention are to provide a seeder of the character described which will be comparatively simple in construction, strong, durable, highly efficient and reliable in use, compact, light in weight and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 2 is a view in side elevation thereof.

Figure 3 is a view in horizontal section, taken substantially on the line 3—3 of Figure 2.

Figure 4 is a view in vertical longitudinal section, taken substantially on the line 4—4 of Figure 3.

Figure 7 is a top plan view of a modification.

Figure 1:
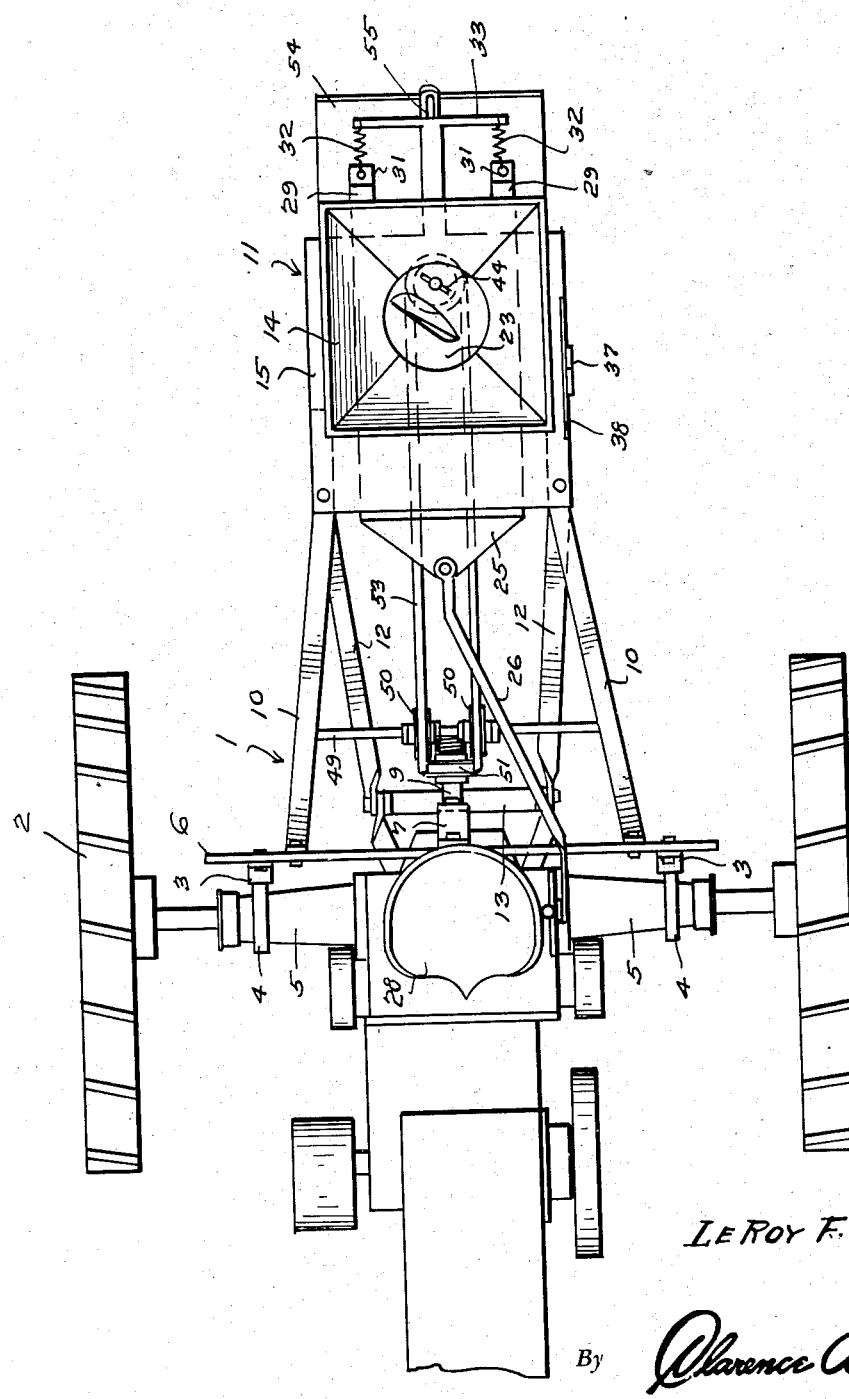
Figure 1 is a top plan view of a seeder constructed in accordance with the present invention, showing the device mounted for operation on the rear end of a tractor.

Referring now to the drawings in detail, it will be seen that reference numeral 1 designates generally a supporting structure or frame which is mounted on the rear end of a conventional tractor 2 in a manner to project rearwardly therefrom. The frame structure 1 includes a pair of brackets 3 which are secured at 4 to the rear axle housings 5 of the tractor 2. Mounted on the upper end portions of the brackets 3 is a transverse bar 6. A brace 7 extends between the bar 6 and the element 8 of the tractor 2 through which the power take-off shaft 9 of said tractor passes.

The frame 1 further includes a pair of angular metallic bars 10 which extend rearwardly from the transverse bar 6. Mounted on the rear end portions of the bars 10 is a hopper base 11. Braces 12 extend between the drawbar 13 of the tractor 2 and the base 11. Mounted on the base 11 is a seed hopper 14.

Figure 5:
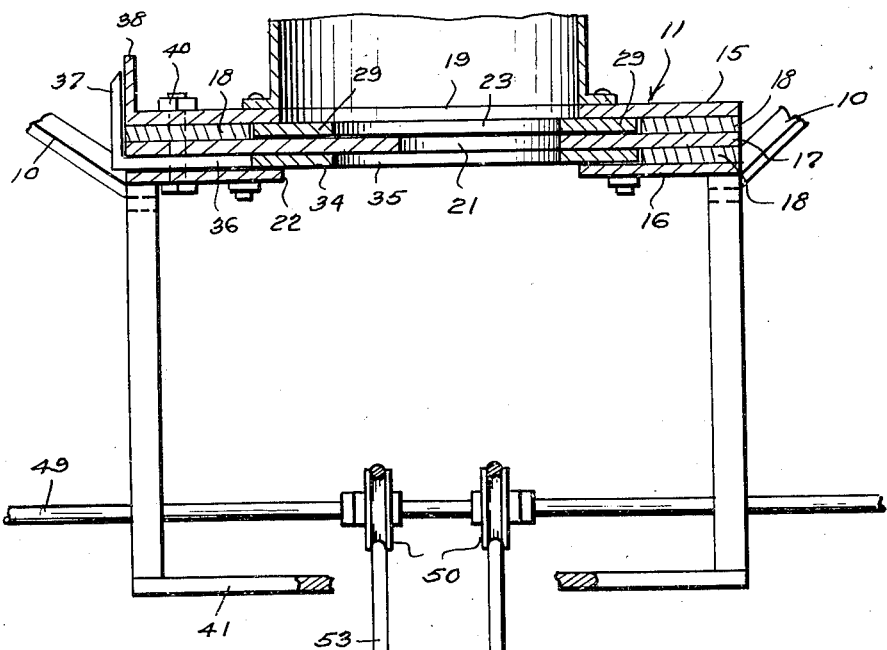
Figure 5 is a cross sectional view through the seed discharge regulating and control means.
Figure 6:
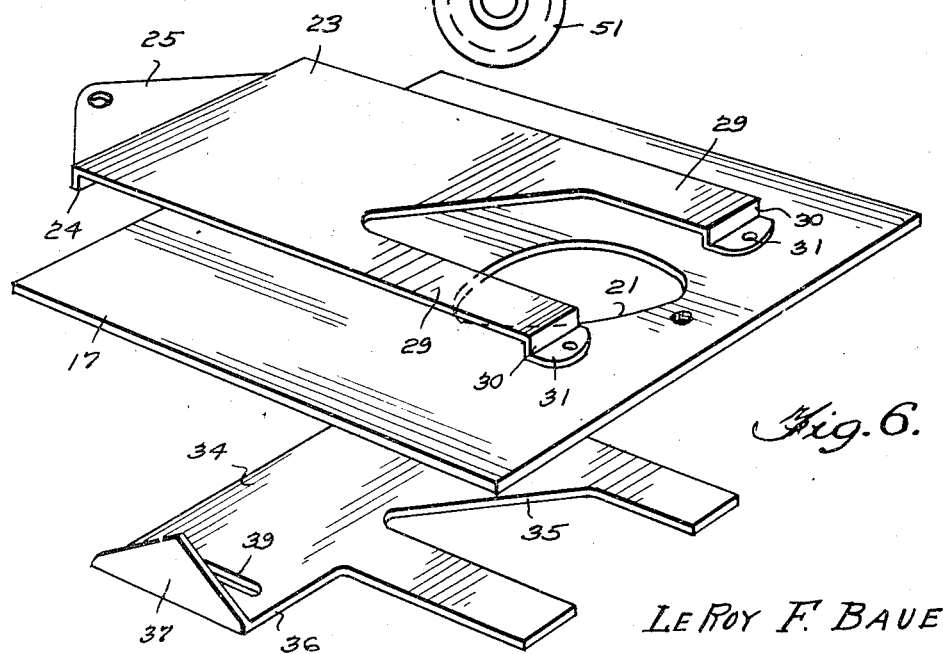
Figure 6 is an exploded perspective view of the seed regulating and control plates.

As best seen in Figures 4, 5 and 6 of the drawings, the base 11 includes a stationary top plate 15 to which the hopper 14 is secured, a stationary lower plate 16 and a stationary intermediate plate 17. Spacers 18 are provided between the plates 17, 15 and 16. The elements 15 to 18, inclusive, are bolted or otherwise firmly secured together. The top plate 15 has formed therein a circular opening 19 which communicates with the hopper 14 and which is of the same diameter as the reduced lower end 20 of said hopper. The intermediate plate 17 has formed therein an opening 21 of substantially the shape shown to advantage in Figure 6 of the drawings for communication with the opening 19. Then, the bottom plate 16 has formed therein a circular opening 22 which is substantially similar to the opening 19 in the top plate 15.

Slidably mounted between the plates 15 and 17 is a longitudinally movable feed control valve in the form of a plate 23. The valve 23 is adapted to open and close the opening 21 in the intermediate plate 17. At its forward end, the valve 23 is provided with a depending flange 24 which terminates in a forwardly projecting apertured lip 25. Pivotally connected to the lip 25 is a rod 26. The forward end portion of the rod 26 is pivotally connected to a suitable hand lever 27 which is mounted on the tractor 2 at a point within convenient reach of the operator sitting on the seat 28 of said tractor. The valve 23 further includes rearwardly extending legs 29 having downturned end portions 30 terminating in rearwardly projecting apertured lips 31 to which coil springs 32 are connected for yieldingly urging said valve 23 toward closed position over the opening 21. The coil springs 32 have one end connected to a substantially T-shaped member 33 which extends rearwardly from the base 11.

Slidably mounted between the plates 17 and 16 of the base 11 is a manually adjustable regulating plate or valve 34 for controlling the capacity of the opening 21. Extending into the regulating plate 34 from the rear end thereof is a recess 35 of the shape shown in Figure 6 of the drawings for communication with the opening 21. Projecting laterally from the regulating valve 34 is an extension 36 having an upturned integral pointer or indicator 37 on its free or outer end which is movable longitudinally adjacent one side of the base 11. Rising from the top plate 15 on this side of the base 11 is a graduated gauge plate 38 on which the indicator 37 is readable to facilitate adjusting the regulating valve 34 to the desired position. The extension 36 is provided with a longitudinally extending slot 39 which accommodates the headed end portion of a bolt 40 in the base 11 for frictionally securing the regulating valve 34 in adjusted position.

Mounted on the rear end portions of the bars 10 and extending downwardly and rearwardly therefrom is an angular metallic frame 41. A vertical shaft 42 has its lower end portion journaled in a suitable bearing 43 which is provided therefor on the intermediate portion of the frame 41. The shaft 42 extends upwardly into the lower portion of the hopper 14 and has fixed on its upper end portion an agitator 44 which is operable in said hopper. The intermediate plate 17 of the base 11, through which the shaft 42 passes, is provided with a suitable bearing 45 for said shaft.

Fixed on the shaft 42 for receiving seed from the hopper 14 is a centrifugal scatterer 46. Also fixed on the shaft 42, below the scatterer 46, is a pulley 47. Hangers 48 depend from the forward portions of the bars 10 of the frame 1 and mounted on said hangers is a transverse shaft 49 having journaled thereon a pair of pulleys 50. A pulley 51 is mounted on the power take-off of the tractor 2 and operatively connected thereto by a suitable overload release clutch 52. An endless belt 53 is trained over the pulleys 47, 50 and 51 for driving the shaft 42 from the power take-off 9 of the tractor 2.

Hingedly mounted on the rear end portion of the base 11 is an adjustable deflector or shield 54 for controlling the rearward broadcasting of the seed by the scatterer 46. A bar 55 is pivotally connected to the baffle or shield 54 and adjustably secured to the member 33.

It is thought that the operation of the device will be readily apparent from a consideration of the foregoing. Briefly, as the tractor with the seeder mounted thereon moves over the ground the scatterer 46 is driven from the power take-off 9 of said tractor. The coil springs 32 normally maintain the control valve 23 in closed position. To permit the discharge of the feed, the valve 23 is moved forwardly against the tension of the coil springs 32 through the medium of the hand lever 27 on the tractor. Thus, the opening 21 is uncovered and the seed falls by gravity into the rotating scatterer 46 from which it is thrown by centrifugal force. The capacity of the opening 21 may be expeditiously regulated as desired by adjusting the longitudinally slidable valve or plate 34. The portions 24 and 30 of the control valve 23 positively limit the forward and rearward sliding movement of said valve.

In the modification illustrated in Figure 7 of the drawings, reference numeral 60 designates a jack shaft which is journaled in suitable bearings 61 which are provided therefor on the transverse bar 6 of the frame 1. A belt 62 is trained over a pulley 63 on the shaft 60 and over one of the usual steering drums 64 of the tractor 2 for actuating said shaft 60. Also fixed on the shaft 60 is a pulley 65 over which the belt 53 is trained. In other respects this form of the invention is substantially similar in construction and operation to the embodiment illustrated in Figures 1 to 6, inclusive, of the drawings.

It is believed that the many advantages of a seeder constructed in accordance with the present invention will be readily understood and although preferred embodiments of the device are as illustrated and described, it is to be understood that further modifications and changes in the details of construction may be resorted to which will fall within the scope of the invention as claimed.

What is claimed is:

In combination, a supporting structure, power means on said supporting structure, a frame on the supporting structure, a seeder comprising a hopper on the frame, said hopper including top, bottom and intermediate plates having openings formed therein, a control valve slidable between the top and intermediate plates for controlling the opening in the intermediate plate, manual means for moving the valve to open position, spring means for moving the valve to closed position, a regulating plate positioned below the intermediate plate, an indicator carried by the regulating plate and extending outwardly of the device, means for securing the regulating plate in adjusted position, a shaft extending into the hopper, an agitator carried by the shaft and positioned in the hopper, a seed scatterer carried by the shaft and located beneath the discharge opening of the lower plate, means for driving the shaft from said power means, a deflector plate carried by the lower plate for controlling the broadcast of the seed, and adjusting means for the deflector plate.

LE ROY F. BAUER.